(12) United States Patent  
Enright

(10) Patent No.: US 6,723,934 B2
(45) Date of Patent: Apr. 20, 2004

(54) METHOD AND APPARATUS FOR ASSISTING LEFT-HANDED MANIPULATION OF A VEHICLE IGNITION SWITCH

(76) Inventor: Marybeth Enright, 295 Corey St., West Roxbury, MA (US) 02132

( * ) Notice: Subject to any disclaimer, the term of this patent is extended or adjusted under 35 U.S.C. 154(b) by 35 days.

(21) Appl. No.: 10/091,213

(22) Filed: Mar. 4, 2002

(65) Prior Publication Data

US 2003/0164282 A1 Sep. 4, 2003

(51) Int. Cl.[7] ................. H01H 9/00; H01H 27/06; B60R 25/04
(52) U.S. Cl. ............. 200/61.54; 180/90; 180/287; 180/315; 296/90
(58) Field of Search ............. 200/61.54; 20/61.85; 180/90, 271, 287, 315, 333; 296/90

(56) References Cited

U.S. PATENT DOCUMENTS

| | | | | |
|---|---|---|---|---|
| 3,916,658 A | * | 11/1975 | Barry | 200/61.54 X |
| 3,938,613 A | * | 2/1976 | Raborn | 200/334 X |
| 4,213,513 A | * | 7/1980 | Beck | 200/61.85 X |
| 4,313,520 A | * | 2/1982 | Chester | 200/61.54 X |
| 5,810,183 A | * | 9/1998 | Feider et al. | 212/291 |

* cited by examiner

Primary Examiner—James R. Scott
(74) Attorney, Agent, or Firm—Robert K. Tendler

(57) ABSTRACT

A system is provided for aiding left-handed individuals or individuals whose right hands are immobilized to be able to start a vehicle by turning an ignition key in which the key slot is movable or placeable to the left of the steering wheel at the driver's option to permit starting of the vehicle utilizing an individual's left hand only. In one embodiment a duplicate key slot is positioned to the left of the steering wheel on the dash of the car or, in a further embodiment, for key slots mounted to the steering column, the column is provided with a duplicate key slot to the left-hand side of the column. In another embodiment, a rotatable sleeve or collar is made part of the steering column, which when rotated rotates the key slot from an initial right-hand position to a left-hand position, thus to enable the starting of the vehicle only utilizing one's left hand.

8 Claims, 6 Drawing Sheets

METHOD AND APPARATUS FOR ASSISTING LEFT-HANDED MANIPULATION OF A VEHICLE IGNITION SWITCH

FIELD OF INVENTION

This invention relates to systems for assisting left-handed individuals and more particularly, to assist them for permitting for an individual who has little or no use of his right hand to be able to start a vehicle.

BACKGROUND OF THE INVENTION

As will be appreciated, vehicles are provided with an ignition system including an ignition key which is inserted into an ignition switch slot in order to turn on the vehicle and to permit the driving thereof.

Invariably, all of the ignition key slots are located to the right-hand side of the steering wheel, with the key being inserted into the ignition switch slot which is either on the dash to the right of the wheel or on the steering column to the right of the wheel.

While these systems work adequately for right-handed individuals, for left-handed individuals, either the individual has to utilize his right hand, not his dominant hand, in order to start the vehicle; or, in the case of disabled individuals, the left-handed individual must reach around or under the steering wheel and position his or her hand in a backwards position in order to be able to insert the key into the key slot which lies to the right-hand side of the wheel.

For those who have right hand impairments, it is only with difficulty that the vehicle can be started. Not only is this because of the difficulty in reaching around with one's left hand to a position to the right of the wheel, often times the ignition system includes mechanical unlocking of the steering column, which requires significant pressure on the key to be able to both initiate the ignition and unlock the steering column.

For those who are not able to use their right hands, the keys will sometimes snap off in the key slot due to the awkward angle at which the individual must turn the key. Thus, not only is it inconvenient for these people to have the key slot to the right of the wheel, it also can result in the total inability of the individual to turn on the vehicle if the key snaps off in the key slot due to the awkward angle at which the individual is trying to turn on the vehicle.

Thus, it is important for left-handed individuals or those having an impaired right hand to have some way of starting the vehicle without undue or unnecessary contortions.

SUMMARY OF THE INVENTION

In order to accommodate left-handed individuals or those having an impaired right hand, in the subject invention, a key slot for the ignition key is provided to the left of the wheel of the vehicle to permit easy access with the left hand, thus to eliminate the problems of having to reach around the wheel and insert the key with one's left hand into a right-sided key slot.

For ignition switches that are mounted to the dash of the vehicle, then in one embodiment an ignition switch which duplicates the action of the ignition switch to the right-hand side of the vehicle is provided on the dash at the left-hand side of the steering wheel. Its function is identical to that of the ignition switch to the right-hand side and thereby permits a left-handed individual or one having an impaired right hand to be able to start the vehicle with ease.

In a second embodiment, a pair of key slots is provided in diametrically opposed positions on the steering column such that a key can be inserted either in the right-hand slot or the left-hand slot in order to start the vehicle and unlock the steering wheel such as desired.

Alternatively, and in a second embodiment, a rotatable collar is positioned on the steering column with the collar having an ignition switch which receives an ignition key in order to turn on the vehicle. This collar is rotatable 180 degrees about the steering column, such that for left-handed individuals or those having impaired right hands the ignition key can be inserted from the left by the left hand.

In all of the above embodiments, it is clear that with vehicles supplied with left-hand key slots for ignition keys, the vehicle can be turned on and the driver accommodated, thus to alleviate the awkwardness and clumsiness associated with prior right-hand key ignition switches.

In summary, a system is provided for aiding left-handed individuals or individuals whose right hands are immobilized to be able to start a vehicle by turning an ignition key in which the key slot is movable or placeable to the left of the steering wheel at the driver's option to permit starting of the vehicle utilizing an individual's left hand only. In one embodiment a duplicate key slot is positioned to the left of the steering wheel on the dash of the car or, in a further embodiment, for key slots mounted to the steering column, the column is provided with a duplicate key slot to the left-hand side of the column. In another embodiment, a rotatable sleeve or collar is made part of the steering column, which when rotated rotates the key slot from an initial right-hand position to a left-hand position, thus to enable the starting of the vehicle only utilizing one's left hand.

BRIEF DESCRIPTION OF THE DRAWINGS

These and other features of the subject invention will be better understood in connection with the Detailed Description in conjunction with the Drawings, of which.

DETAILED DESCRIPTION

Figure 1A:
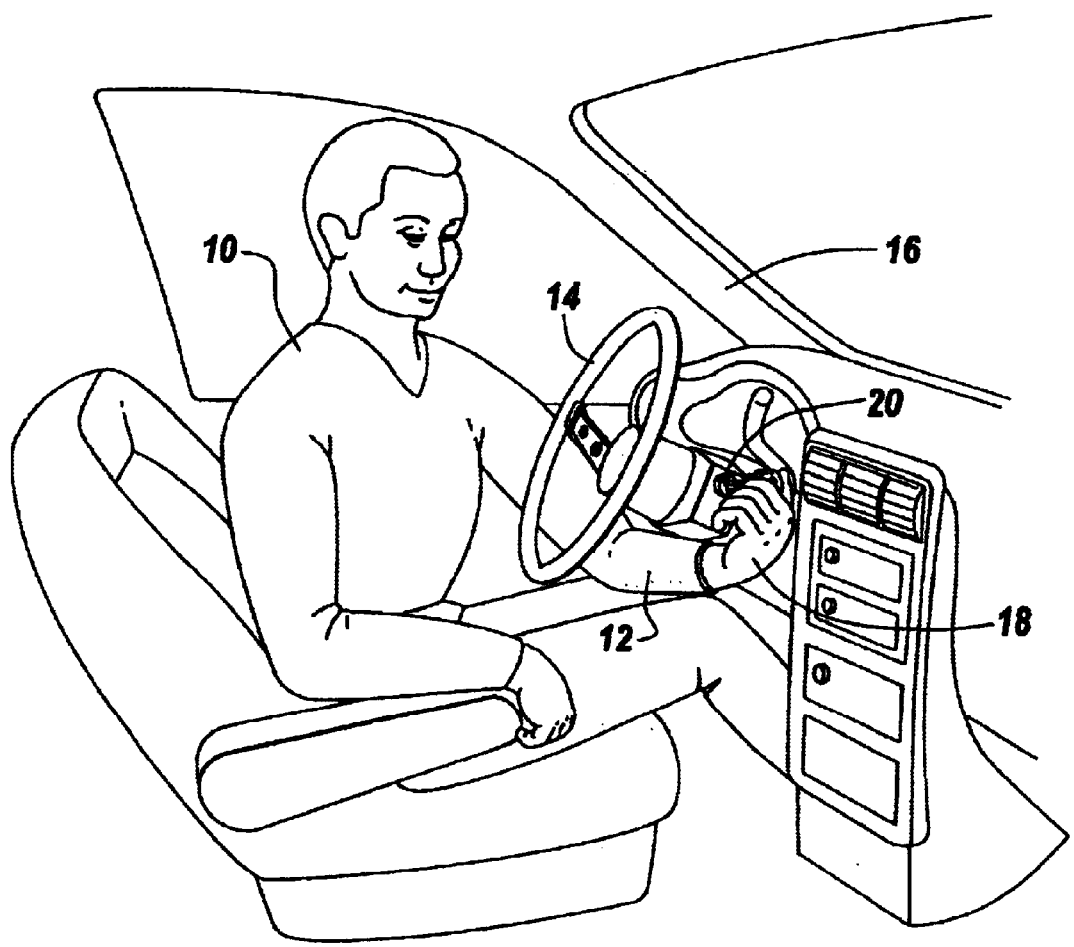
FIG. 1A is a diagrammatic illustration of the contortions necessary for a left-handed individual to be able to insert a key into a right-handed key slot.

Referring now to FIG. 1, an individual 10 is shown having an arm 12 which is reaching under a steering wheel 14 of a vehicle 16 in which the wrist 18 of individual 10 is bent in an awkward position so as to be able to insert key 20 into a right-handed ignition switch at the column of wheel 14.

Figure 1B:
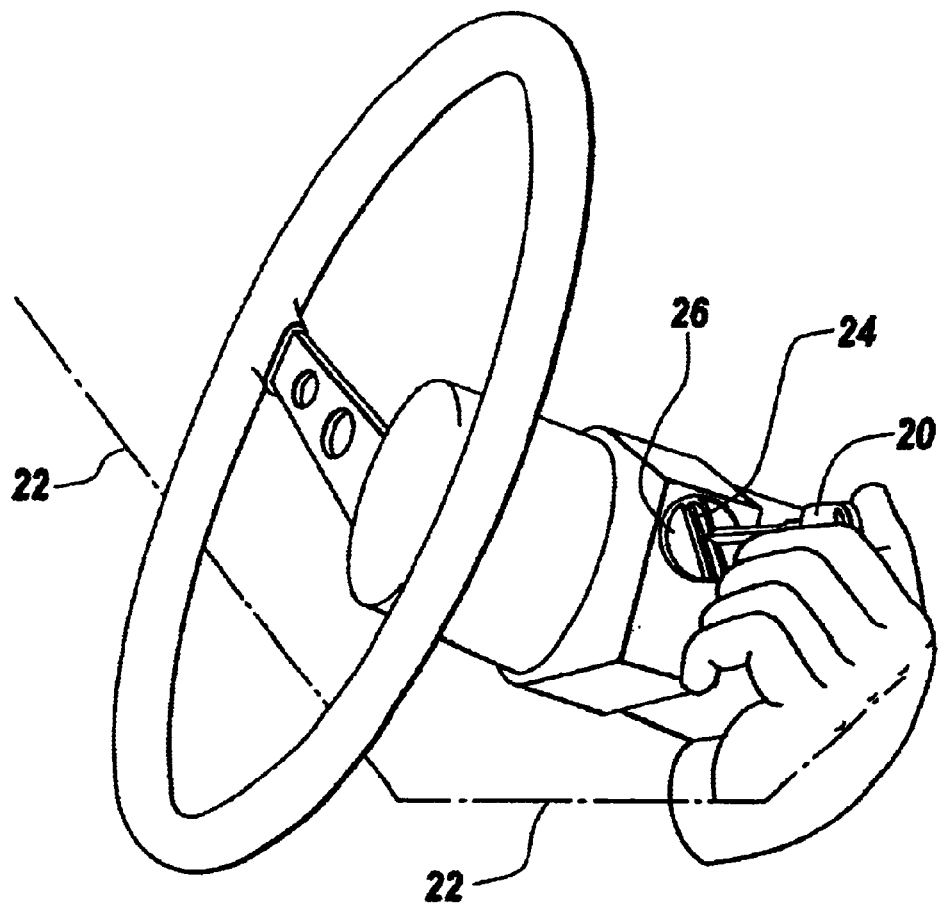
FIG. 1B is a diagrammatic illustration of the situation depicted in FIG. 1A, in which the motion of the left-hand to address a right-handed key slot for right-handed entry of the key is depicted.

It will be appreciated, referring to FIG. 1B, that in one embodiment, the path that arm 12 and wrist 18 must follow is along dotted path 22 such that key 20 can be appropriately inserted into slot 24 of ignition switch 26 so that the vehicle can be turned on.

Whether the individual reaches under wheel 14 or over it, the amount of side pressure necessary to turn key 20 is relatively high to both turn the ignition switch and unlock the steering column for those vehicles that have a steering column lock which is unlocked through turning the ignition key.

So awkward and difficult is the turning on of such a vehicle for a left-handed person or one having a right hand that is disabled that the key often times cannot be inserted properly or if inserted is sometimes broken off due to the awkward angle which key 20 is grasped by the left hand.

Figure 2:
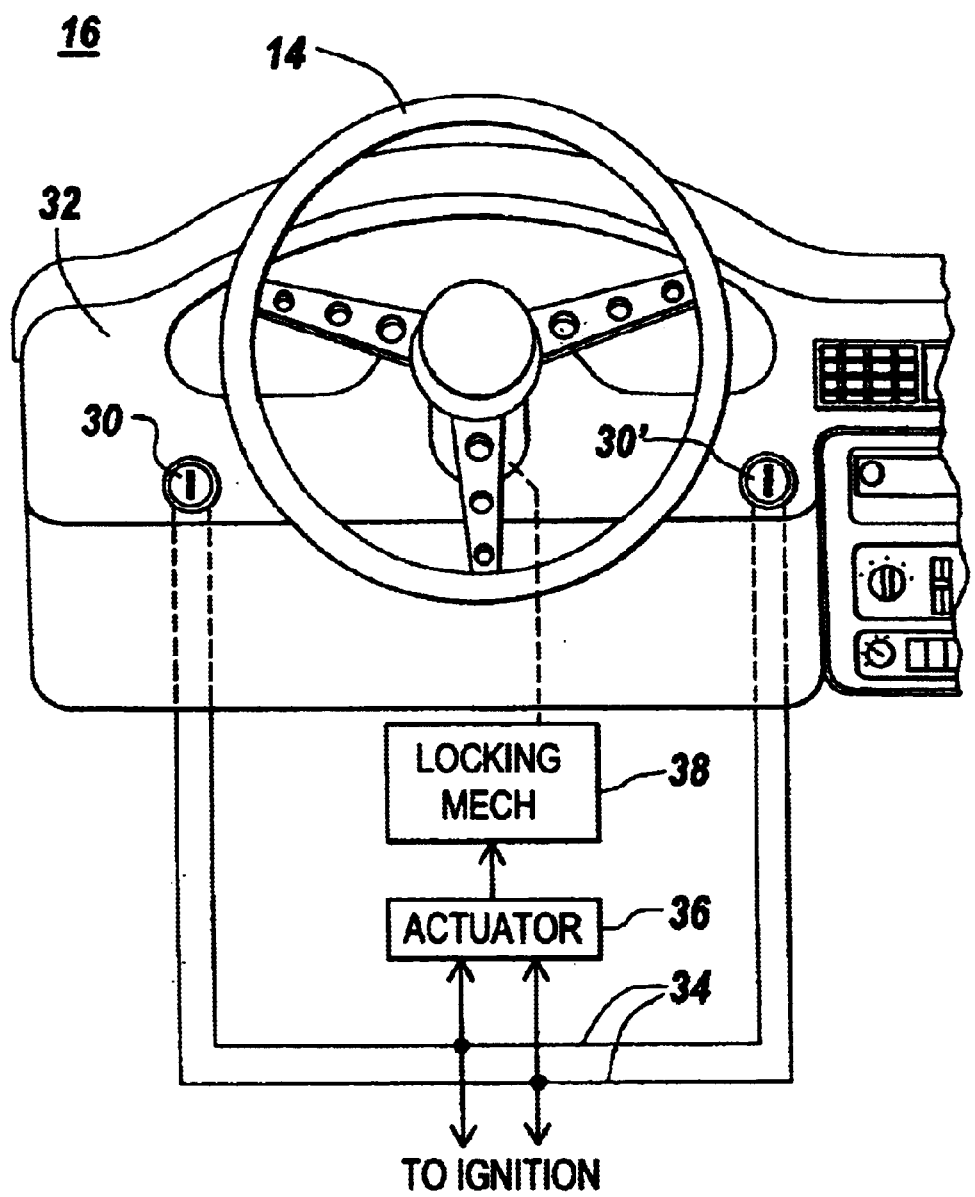
FIG. 2 is a diagrammatic illustration of the subject invention in which an ignition switch having a key slot is positioned to the left-hand side of the steering wheel of the vehicle and is connected in parallel with the key ignition switch located on the right-hand side of the wheel on the dashboard of the vehicle.

Referring now to FIG. 2, in one embodiment of the subject invention, an ignition switch 30 is positioned to the left-hand side of wheel 14 on dash 32 of vehicle 16, with the vehicle being provided as is common with a right-hand ignition switch 30'.

As will be seen electrically and mechanically, these switches are connected and parallel such that in one embodiment, not only is the closure of a key switch communicated over lines 34 to the vehicle's ignition system, the same switch closures communicated to an actuator 36 in turn coupled to an electromechanical steering wheel unlocking system 38 such that the vehicle can be started from either the left-hand or right-hand position with either of the person's left hand or right hand while at the same time also unlocking the steering wheel by virtue of turning the key in the switch slot of the corresponding ignition switch.

Figure 3:
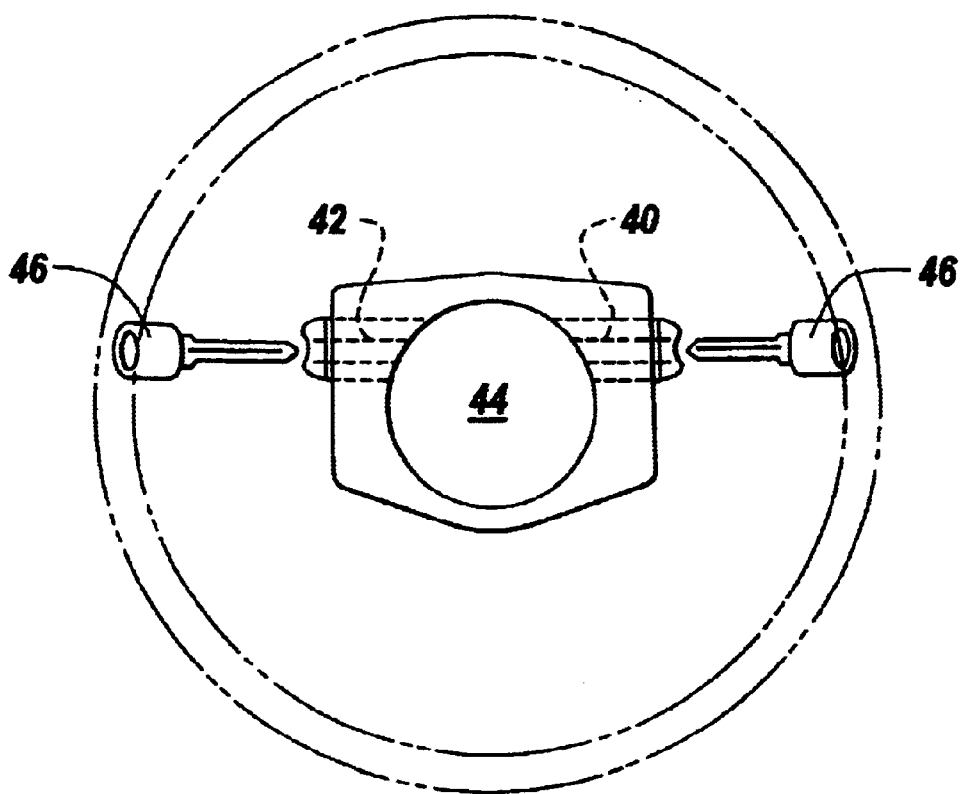
FIG. 3 is a diagrammatic and top illustration of the utilization of two key slots, one extending to the right of the wheel of the vehicle and the other to the left, indicating a duplicate key slot on the steering column for use by a left-handed or right-hand impaired individual.

Referring to FIG. 3, in another-embodiment, ignition switch key slots 40 and 42 are provided on diametrically opposite sides of steering column 44 such that a key 46 can be inserted from the right or from the left, as illustrated. This means that for left-handed people or those having impaired right hands the person uses his or her left hand to insert the key into key slot 42 as opposed to key slot 40, thus enabling the individual to conveniently turn on and operate the vehicle.

Figure 4A:
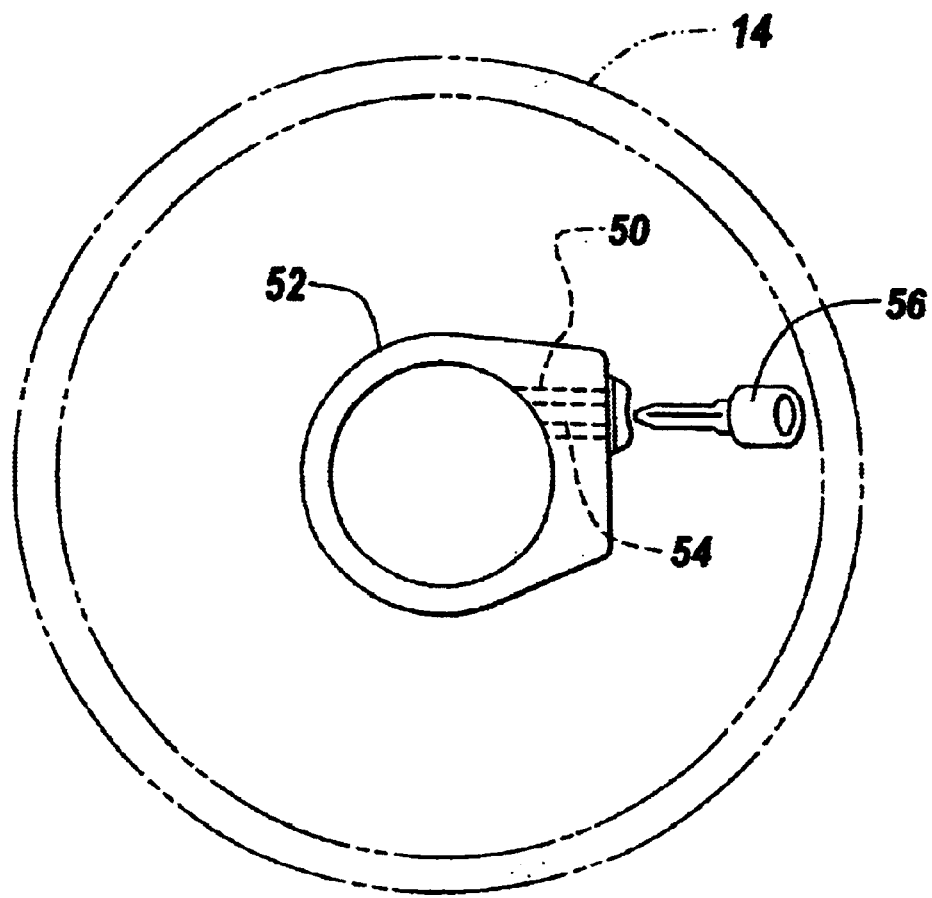
FIG. 4A is a diagrammatic illustration of the utilization of an ignition switch having a key slot which is mounted on a collar on the steering column which can be rotated from a right-hand position to a left-hand position; and, FIG. 4B is a diagrammatic illustration of the ignition switch and key slot of FIG. 4A indicating its movement 180 degrees so as to provide left-handed slot entry for the ignition key.

Referring to FIG. 4A, in a still further embodiment, an ignition switch 50 may be housed in a rotatable collar 52 which is assembled on the steering column, with ignition switch 50 having a key slot 54 which in FIG. 4A extends to the right to permit a key 56 to enter from the right and to turn the ignition switch.

Figure 4B:
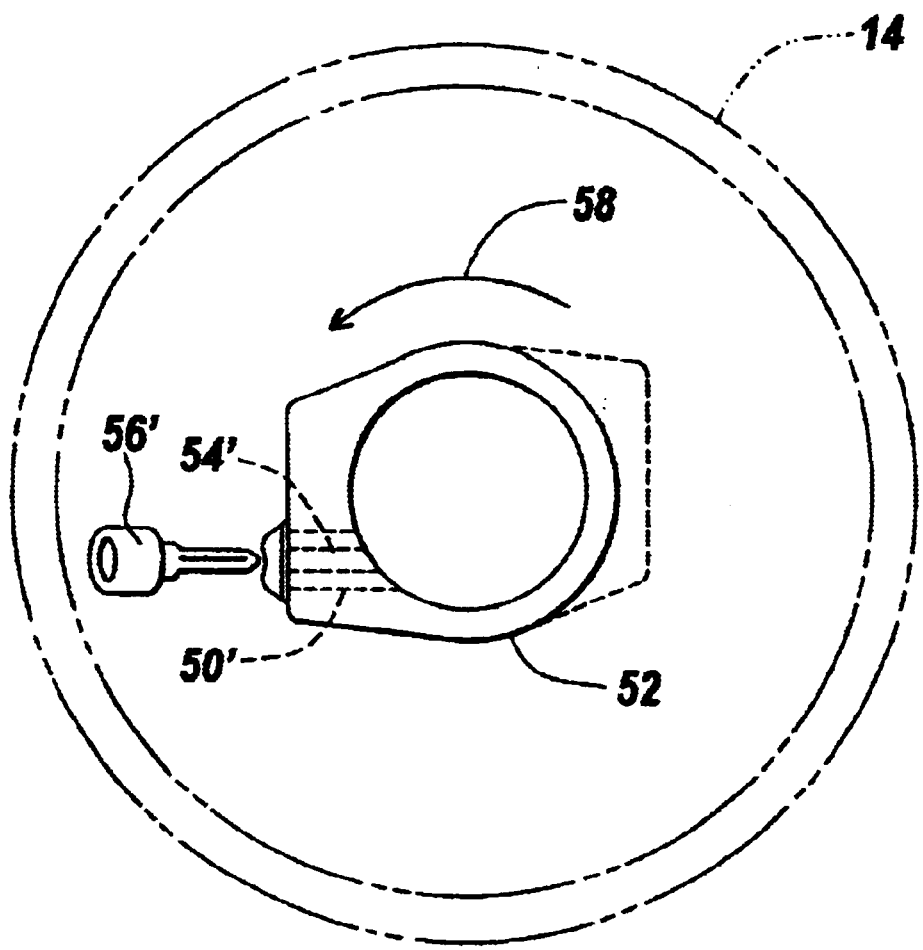

For left-handed individuals or those having right-hand infirmities, the collar in FIG. 4A can be rotated as illustrated at arrow 58 such that it arrives in the position shown in FIG. 4B illustrated by 50'. Key 56' is thereby permitted to activate the car or the vehicle by insertion from the left, with the rotation of the collar permitting positioning of the original right-hand entry key slot so that it is accessible from the left and therefore by a person who is left-handed or using one's left hand.

In summary, it will be seen that what is provided is a system for permitting left-handed people or those having right-hand impairments to easily turn on a vehicle through the utilization of a vehicle ignition switch without having to resort to contortions or movements which can sometimes cause the breaking of the key within the key slot.

Vehicles can thus be manufactured with either ignition switches to the left-hand side of the wheel on the dash, or with key slot access to the left of the steering column, thus to provide handicapped access to the vehicles while at the same time accommodating those individuals who are naturally left-handed.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for assisting left-handed manipulation of a vehicle ignition switch by an individual for a vehicle having a steering wheel, comprising the steps of:

providing the vehicle with a steering wheel column having a rotatable collar containing an ignition switch; and, rotating the collar so as to provide the ignition switch to the left or right side of the steering wheel such that the ignition switch can be located for convenient ignition key insertion by a left- or right-handed person such that the ignition switch may be turned on by insertion of an ignition key into the key slot with the left hand of the individual, whereby the vehicle may be started by only using the left hand.

2. The method of claim 1, wherein the steering wheel is lockable and unlocked by manipulation of the ignition switch, and wherein the ignition key manipulation also results in unlocking the steering wheel.

3. A vehicle ignition system for a vehicle having a steering wheel, comprising, an ignition switch mounted to the left of said wheel, said vehicle having a dashboard, said ignition switch mounted at said dashboard to the left of said steering wheel.

4. A vehicle ignition system for a vehicle having a steering wheel and a steering column and further including a rotatable collar on said steering column, said ignition switch being mounted on said collar such that said key slot may be made to face right or left depending on the rotational position of said collar.

5. A method of assisting left-handed manipulation of a vehicle ignition switch by an individual for a vehicle having a steering station, comprising the step of providing an ignition switch on the dashboard of the vehicle to the left of the steering station at a position easily accessible by a left-handed individual seated at the steering station.

6. The method of claim 5, and further including providing an ignition switch on the dashboard to the right of the steering station at a position easily accessible to a right-handed individual seated at the steering station, thereby to provide a universal left-handed/right-handed dashboard-mounted ignition system.

7. The method of claim 6, wherein the ignition switches are mounted during the manufacture of the vehicle.

8. The method of claim 6, wherein the ignition switches are connected in parallel.

\* \* \* \* \*